Patented Oct. 14, 1952

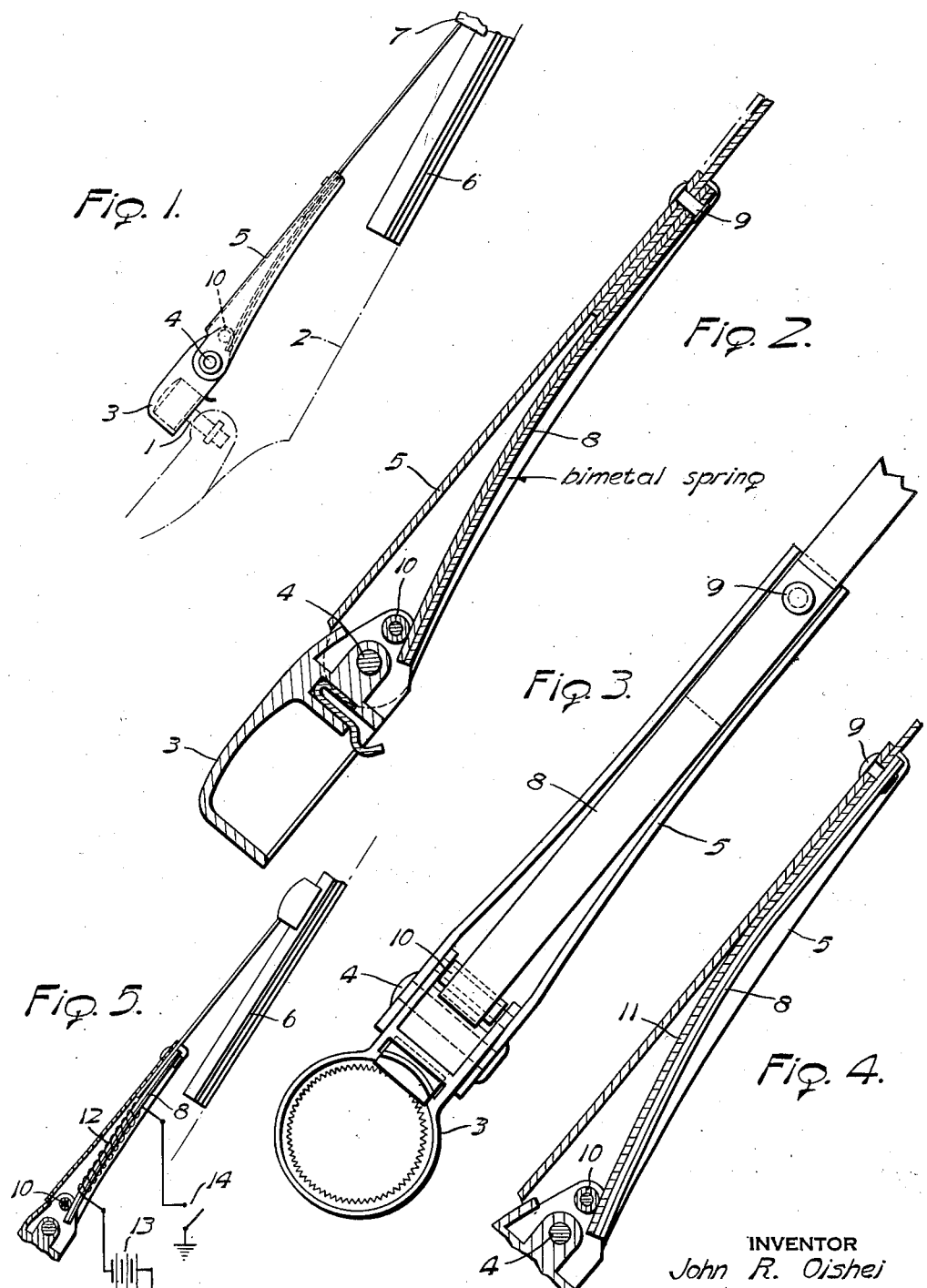

2,613,387

UNITED STATES PATENT OFFICE 2,613,387

WINDSHIELD CLEANER

John R. Oishei, Buffalo, N. Y., assignor to Trico Products Corporation, Buffalo, N. Y.

Application February 4, 1947, Serial No. 726,396

12 Claims. (Cl. 15—255)

This invention relates to the windshield cleaning art and primarily to the wiper carrying arm which imposes a spring urge upon the wiper or blade in order to secure the desired pressure in the wiping contact of the blade upon the windshield surface.

The primary object of the present invention is to provide an improved wiper arm by which the spring urge will be varied in accordance with climatic changes. For example, in one season of the year it may be more desirable to have a heavier wiping pressure than in other seasons. Again, it may be desirable to lighten the spring urge upon the rubber wiper during hot weather to avoid the rubber taking a set and thereby becoming deformed with a consequential impairment in its wiping efficiency.

More particularly the aim of the present invention is to provide a windshield cleaner in which the wiping pressure or spring urge will be thermostatically controlled for securing a uniformity in the operation of the windshield cleaner mechanism.

Further, the invention has as an important object the provision of a windshield cleaner in which the wiping pressure may be selectively varied and placed under the control of a motorist whereby he may adjust the wiping pressure from his seat whenever the necessity for such pressure variation arises.

These and further objects will manifest themselves as the following description progresses, reference being had to the accompanying drawing, wherein Fig. 1 is a view showing the improved wiper arm as operatively applied to a windshield;

Fig. 2 is a longitudinal sectional view more clearly showing a thermostatic control for the spring pressure of the arm;

Fig. 3 is a fragmentary bottom plan view of the arm;

Fig. 4 is a view showing a modified embodiment of the invention; and

Fig. 5 is a further embodiment in which the thermostatic action is manually controlled.

Referring more particularly to the drawing, the numeral 1 designates an oscillatory drive shaft suitably journaled at the lower side of the windshield 2 and carrying at its forward end the wiper arm which latter embodies a shaft mounted section 3 to which is pivotally connected, as by a pin 4, the outer, wiper carrying section 5. At its free end, this outer section is connected to the wiper 6 by an attaching clip 7 so that when the shaft oscillates the wiper arm, the wiper will be moved back and forth across the surface of the windshield 2.

The wiping pressure is imposed upon the wiper 6 through the outer arm section 5, and for this purpose the illustrated embodiment of the invention utilizes a flat spring 8 which is suitably anchored at one end to one of the arm sections, as indicated at 9, and has its opposite end bearing upon and deflected by a supporting part 10 on the companion arm section. The arrangement is such that the flat spring 8 urges the wiper carrying end of the arm toward the windshield.

In accordance with the present invention, temperature responsive means are provided to vary the spring urge impressed upon the wiper by the arm in harmony with the prevailing temperature of the surrounding atmosphere.

A simple and compact embodiment of the present invention incorporates the temperature responsive characteristic in the pressure spring 8. To this end the spring is made of a thermally responsive, bi-metal strip with the result that as temperature changes occur the thermally responsive, bi-metal spring will likewise respond to vary the urge placed upon the wiper. The two metals composing the thermostatic spring will have different coefficients of expansion. As an example, the bi-metal spring may be composed of layers of brass and steel suitably united to secure the thermostatic flexure. The steel strip may be heavier than the brass strip to insure the proper spring pressure for the wiping contact. The wiper actuating arm will therefore vary the degree of its urge upon the wiper. This will enable a firmer contact on the windshield glass at one time of the year in comparison to the spring urge imposed at other times. Thus, the wiping pressure may be increased for winter use over that determined for summer use. Especially would this be desirable in use with an antifreezing agent. Again, it may be advisable to have the wiper move with a firm contact on the glass during the summer months of the year, and with a lighter contact during the winter months.

In the modified embodiment a separate spring 11 is employed to provide the primary wiping pressure. This spring may be arranged to one side of the thermostatic spring, or may be arranged in superimposed relation thereto, either underneath or on top of the bi-metal strip, the arrangement being such that the thermally responsive element will tend to modify the functioning of the primary spring 11. The thermostatic spring will therefore modify the spring action of the arm by adding to or subtracting from the combined spring pressure of both spring elements 8 and 11. This arrangement enables the two spring elements to have different degrees of elasticity as well as different characteristics. With the secondary or thermostatic spring being superimposed directly upon the primary spring, the former will act upon the latter to modify the action of such primary spring.

The wiping pressure is automatically regulated to accomplish the greatest efficiency from the windshield cleaner. The construction is simple and the arm may therefore be economically manufactured with a minimum number of parts and operations. If desired, the anchorage 9 may be in the form of a screw to enable general adjustment so as to condition the arm for seasonal use. In this event the thermostatic element would function automatically to modify the general setting of the spring made by manually adjusting the mounting screw, the latter passing through the spring and threading into the body of the spring carrying arm section.

In the modification depicted in Fig. 5 the thermostatic bar or spring 8 will function under normal conditions in the same manner as in the embodiment of Figs. 1, 2 and 3. However, it may become necessary or desirable at times to temporarily vary the wiping pressure as, for example, to remove ice particles adhering to the windshield, for which purpose the wiping pressure may be increased. To this end there is associated with the thermostatic spring a heating element 12, such as an electric resistance wire which will be connected to the source of electric energy 13 by a switch 14 accessible to the motorist. Obviously the thermostatic spring may be made to function in an opposite manner, i. e. to lighten the wiping pressure by the application of heat to the resistance, by reversing the bi-metal spring. Thus, the heating member 12 constitutes a means which is readily accessible to the motorist for varying the wiping pressure for a predetermined time interval.

While the foregoing description has been given in detail for the sake of clearness, it is not intended thereby to impose any limitations upon the inventive principles which may assume other physical embodiments without departing from the spirit of the invention and the scope of the appended claims.

What is claimed is:

1. A wiper arm for windshield cleaners, having a movable wiper carrying part, and resilient means acting on said part to impose a spring urge upon a carried wiper, said resilient means including a thermoresponsive element for varying the spring urge upon the wiper in accordance with predetermined temperature changes.

2. A windshield wiper arm comprising pivotally connected inner and outer sections, with spring means reacting between the sections resiliently to urge the outer section toward an associated windshield, said spring means embodying thermoresponsive means operable to vary the urge of said spring means.

3. A wiper arm comprising a shaft mounted section and a pivotally connected wiper carrying section, a spring anchored to one section and bearing upon the companion section to urge the wiper carrying section resiliently toward an associated windshield, and thermo-responsive means responsive to predetermined temperature changes and acting on said spring to vary such urge for changing the wiping pressure.

4. A wiper arm comprising pivotally connected inner and outer sections, and spring means embodying a flat spring anchored at one end on one section and having its free end supported under lateral deflection by a part of the companion section, said spring means incorporating a thermo-responsive element for varying the lateral deflection of the flat spring in accordance with and in response to thermal changes in the surrounding atmosphere.

5. A wiper arm having a shaft engaging section and a pivotally connected blade actuating section, and a thermal bi-metal spring mounted on one section and bearing upon deflection upon the adjacent section for varying the spring pressure imposed upon such blade in accordance with temperature changes.

6. A wiper arm comprising pivotally joined inner and outer arm sections, a flat spring arranged between said section and being anchored at one end to one section with its opposite end portion supported under lateral deflection by a part on the companion section and varying in its deflection during relative pivotal movement between the sections, and thermo-responsive means acting within the spring to modify its spring force.

7. A wiper arm comprising pivotally joined inner and outer arm sections, a spring anchored at one end to one section with its opposite end portion supported under lateral deflection by a part on the companion section and varying in its deflection during relative pivotal movement between the sections, thermally responsive spring means superimposed upon and coacting with said spring to modify the total spring pressure applied to a wiper carried at the outer end of said arm.

8. A wiper arm for windshield cleaners, comprising a shaft engaging section and a blade actuating section pivotally connected thereto, a flat spring having one end anchored to one section and its opposite end bearing laterally on a part of the companion section, and a thermo-responsive bi-metal spring arranged on the flat spring for coacting therewith in providing the wiping pressure for such blade.

9. A wiper arm for windshield cleaners, comprising a shaft engaging section and a blade actuating section pivotally connected thereto, a flat spring having one end anchored to one section and its opposite end bearing laterally on a part of the companion section to provide the wiping pressure in such wiper, and a thermostatic thermoresponsive bi-metal strip anchored to said one section and supported by said part of the companion section for coacting with said spring in providing the spring pressure for varying the wiping pressure in accordance with the surrounding temperature.

10. A wiper arm for windshield cleaners having a wiper carrying part and a spring acting thereon for providing the required wiping pressure in the contact of the wiper upon the surface being wiped, and thermo-responsive means acting on the spring to modify the spring urge in accordance with the surrounding temperature.

11. A wiper arm for windshield cleaners, comprising a body having a wiper carrying part movable toward and from the surface being wiped, thermostatic spring means acting upon said part to provide the desired wiping pressure for the wiper, and heating means associated with the thermostatic means to regulate the wiping pressure.

12. A wiper arm for windshield cleaners, comprising a body having a wiper carrying part movable toward and from the surface being wiped, thermostatic spring means acting upon said part to provide the desired wiping pressure for the wiper, and manually controlled heating means acting upon the thermostatic means to regulate the wiping pressure.

JOHN R. OISHEI.

REFERENCES CITED

The following references are of record in the file of this patent:

UNITED STATES PATENTS

| Number | Name | Date |
|---|---|---|
| 1,109,852 | Marschall | Sept. 8, 1914 |
| 1,368,982 | Beitman | Feb. 15, 1921 |
| 1,898,174 | Dubilier | Feb. 21, 1933 |
| 2,025,888 | Olivero | Dec. 21, 1935 |
| 2,332,660 | Mussen | Oct. 26, 1943 |